United States Patent
Kano et al.

(10) Patent No.: US 12,180,618 B2
(45) Date of Patent: Dec. 31, 2024

(54) DYEABLE POLYOLEFIN FIBER AND FIBROUS STRUCTURE COMPRISING SAME

(71) Applicant: Toray Industries, Inc., Tokyo (JP)

(72) Inventors: Hidekazu Kano, Mishima (JP); Masashi Nagao, Mishima (JP); Katsuhiko Mochizuki, Mishima (JP)

(73) Assignee: Toray Industries, Inc., Tokyo (JP)

( * ) Notice: Subject to any disclaimer, the term of this patent is extended or adjusted under 35 U.S.C. 154(b) by 341 days.

(21) Appl. No.: 16/960,175

(22) PCT Filed: Jan. 10, 2019

(86) PCT No.: PCT/JP2019/000459
§ 371 (c)(1),
(2) Date: Jul. 6, 2020

(87) PCT Pub. No.: WO2019/142718
PCT Pub. Date: Jul. 25, 2019

(65) Prior Publication Data
US 2021/0054536 A1     Feb. 25, 2021

(30) Foreign Application Priority Data
Jan. 18, 2018 (JP) .................. 2018-006473

(51) Int. Cl.
*D01F 8/06* (2006.01)
*C08L 67/02* (2006.01)
*D01F 8/14* (2006.01)

(52) U.S. Cl.
CPC .............. *D01F 8/06* (2013.01); *C08L 67/02* (2013.01); *D01F 8/14* (2013.01)

(58) Field of Classification Search
CPC ..... D01F 8/06; D01F 8/14; D01F 1/10; D01F 6/46; D01F 6/92; C08L 167/02; C08L 23/12; C08L 67/02; C08L 67/025; C08L 67/04; C08G 63/08; C08G 63/181; C08G 63/183; C08G 63/187; C08G 63/672; D01D 5/08; D01D 5/34

USPC .......................................................... 428/373
See application file for complete search history.

(56) References Cited

FOREIGN PATENT DOCUMENTS

| CN | 101824666 B | * | 11/2012 | |
|---|---|---|---|---|
| EP | 1731634 A1 | * | 12/2006 | .............. D01D 5/36 |
| JP | 58220816 A | * | 12/1983 | |
| JP | 04-209824 A | | 7/1992 | |
| JP | 06-25912 A | | 2/1994 | |
| JP | 06248514 A | * | 9/1994 | |
| JP | 07-90783 A | | 4/1995 | |
| JP | 09324355 A | * | 12/1997 | |
| JP | 11-256465 A | | 9/1999 | |
| JP | 2001-522947 A | | 11/2001 | |
| JP | 2004-232182 A | | 8/2004 | |
| JP | 2007-308830 A | | 11/2007 | |
| JP | 2008-533315 A | | 8/2008 | |
| JP | 2014-047441 A | | 3/2014 | |
| JP | 2017-214662 A | | 12/2017 | |
| KR | 2004-0085726 A | | 10/2004 | |
| WO | 2017/154665 A1 | | 9/2017 | |
| WO | 2018/034160 A1 | | 2/2018 | |

OTHER PUBLICATIONS

Machine Translation of JP 06248514 A (Year: 1994).*
Machine Translation of JP 58220816 A (Year: 1983).*

* cited by examiner

*Primary Examiner* — Camie S Thompson
(74) *Attorney, Agent, or Firm* — DLA Piper LLP (US)

(57) ABSTRACT

A dyeable polyolefin fiber is a polymer alloy fiber having a sea-island structure in which the sea ingredient comprises a polyolefin (A) and the island ingredient comprises a polyester (B), the fiber having a degree of elongation of 10-80%. The polyester (B) in the dyeable polyolefin fiber has an orientation parameter, as determined by Raman spectroscopy, of 1.1-10.0. The dyeable polyolefin fiber is a highly lightweight polyolefin fiber capable of being brightly and deeply colored, is excellent in terms of color fastness and evenness in dyeing, and is suitable for use as a fibrous structure.

6 Claims, No Drawings

DYEABLE POLYOLEFIN FIBER AND FIBROUS STRUCTURE COMPRISING SAME

TECHNICAL FIELD

This disclosure relates to a dyeable polyolefin fiber, more specifically, to a dyeable polyolefin fiber in which bright and deep color developability is imparted to the lightweight polyolefin fiber, that is also excellent in terms of color fastness and level dyeability and can be suitably adopted as a fibrous structure.

BACKGROUND

Polyethylene fibers and polypropylene fibers, which are one type of polyolefin-based fibers, are superior in lightweight property and chemical resistance, but have the disadvantage of being difficult to dye due to the absence of polar functional groups. Therefore, they are not suitable for clothing applications and are currently used in a limited range of applications including interior applications such as tile carpets, household carpets, and automobile mats, and general material applications such as ropes, protective nets, filter fabrics, narrow tapes, braids, and chair upholstery.

A simple dyeing method of polyolefin-based fibers includes addition of a pigment. However, with the use of a pigment, it is difficult to stably develop bright color developability or light colors as compared with the use of a dye, and when a pigment is used, there has been a disadvantage that the fibers tend to be hard, leading to impair flexibility.

As a dyeing method to replace the use of a pigment, surface modification of poly-olefin-based fibers has been proposed. For example, in Japanese Patent Laid-open Publication No. H07-90783, attempts are made to improve dyeing properties through surface modification of polyolefin-based fibers by performing ozone treatment or ultraviolet ray irradiation to cause graft copolymerization of vinyl compounds.

Further, a technique has been proposed in which a dyeable polymer is combined with a polyolefin with poor dyeing properties. For example, Japanese Patent Laid-open Publication No. H04-209824 proposes a dyeable polyolefin fiber in which polyester or polyamide is blended as a dyeable polymer into polyolefin.

Further, in Japanese Translations of PCT International Application Publication No. 2008-533315 and PCT International Application Publication No. 2001-522947, attempts are made to improve the color developability by rendering dyeable polymers to be blended into polyolefins amorphous. Specifically, a dyeable polyolefin fiber in which a copolyester copolymerized with cyclohexanedimethanol is blended as a dyeable amorphous polymer into polyolefin is proposed in JP '315, and a dyeable polyolefin fiber in which a copolyester copolymerized with isophthalic acid and cyclohexanedimethanol is blended as a dyeable amorphous polymer into polyolefin is proposed in JP '947.

The method described in JP '783, however, requires a long time for ozone treatment and ultraviolet ray irradiation, leading to low productivity and difficulties in industrialization.

In addition, in the method of JP '824, color developability could be imparted to a polyolefin fiber with a dyeable polymer, but since the dyeable polymer was crystalline, color developability was insufficient and the color lacked brightness and depth.

In the methods of JP '315 and JP '947, color developability of the polyolefin fiber was improved by rendering the dyeable polymer amorphous. However, since the molecular orientation of the dyeable polymer in the polyolefin fiber was not controlled, when the molecular orientation was high, there was a problem that dyeing becomes insufficient, and thus brightness and depth were still insufficient, and when the molecular orientation was low, there was a problem that level dyeability and color fastness were inferior due to reduction cleaning and soaping after dyeing, and loss of dye due to rubbing during use and washing.

It could therefore be helpful to provide a dyeable polyolefin fiber in which bright and deep color developability is imparted to the lightweight polyolefin fiber, that can be suitably adopted as a fibrous structure.

SUMMARY

We thus provide:

A dyeable polyolefin fiber which is a polymer alloy fiber having a sea-island structure including a polyolefin (A) as a sea component and a polyester (B) as an island component and having a degree of elongation of 10 to 80%, in which the polyester (B) in the dyeable polyolefin fiber has an orientation parameter, as determined by Raman spectroscopy, of 1.1 to 10.0.

Further, the polyester (B) in the dyeable polyolefin fiber preferably has a crystallinity, as determined by Raman spectroscopy, of 1 to 40%.

The main constituent component of the polyester (B) is a dicarboxylic acid component (B1) and a diol component (B2), preferably at least one dicarboxylic acid component (B1) selected from an aliphatic dicarboxylic acid (B1-1), an alicyclic dicarboxylic acid (B1-2) and an aromatic dicarboxylic acid (B1-3), and at least one diol component (B2) selected from an aliphatic diol (B2-1), an alicyclic diol (B2-2) and an aromatic diol (B2-3). In addition, it can be suitably adopted that the main constituent component of the polyester (B) is any one selected from an aliphatic oxycarboxylic acid, an alicyclic oxycarboxylic acid, and an aromatic oxycarboxylic acid. Further, the polyester (B) is preferably a copolyester.

Moreover, the dyeable polyolefin fiber can be suitably adopted for a fibrous structure at least partly including it.

It is thus possible to provide a dyeable polyolefin fiber in which bright and deep color developability is imparted to the lightweight polyolefin fiber, that is also excellent in terms of color fastness and level dyeability. If processed into a fibrous structure, the obtained dyeable polyolefin fiber can be used favorably in clothing applications and in a wide range of applications that require lightweight property and color developability, in addition to interior and general material applications where conventional polyolefin-based fibers have been used.

DETAILED DESCRIPTION

The dyeable polyolefin fiber is a dyeable polyolefin fiber which is a polymer alloy fiber having a sea-island structure including a polyolefin (A) as a sea component and a polyester (B) as an island component and having a degree of elongation of 10 to 80%, in which the polyester (B) in the dyeable polyolefin fiber has an orientation parameter, as determined by Raman spectroscopy, of 1.1 to 10.0.

By disposing the polyester (B) as a dyeable polymer in the island in the polyolefin (A) as a sea component, color developability can be imparted to the polyolefin (A). In addition, unlike when a dyeable polymer is disposed as a core of a core-sheath composite fiber or when it is disposed as islands of a sea-island composite fiber, a dyeable polymer as an island component is exposed on a fiber surface in a polymer alloy fiber so that it is possible to obtain a fiber having increased color developability and a color developing efficiency due to the light transmitted to the island component being increased, and bright and deep color development can be realized.

We conducted intensive studies on grant of bright and deep color developability and improvement in color fastness and level dyeability which have been conventional problems in polyolefin fibers and, as a result, while detail will be described later, the molecular orientation of the dyeable polyester (B) in the dyeable polyolefin fiber controlled in a specific range, according to the type and copolymerization ratio of the copolymerization component of the polyester (B), the melt viscosity ratio of the polyolefin (A) of the sea component and the polyester (B) of the island component, the degree of elongation of the dyeable polyolefin fiber and the like, whereby it has succeeded in imparting bright and deep color developability to the polyolefin fiber, and has made it possible to obtain a dyeable polyolefin fiber with excellent color fastness and level dyeability.

The polymer alloy fiber refers to a fiber in which an island component is dispersed discontinuously. That an island component is discontinuous is that the island component exists with an appropriate length in the longitudinal direction of a fiber, the length is several tens nm to several hundreds of thousands nm, and a single yarn differs in shape of its sea-island structure in cross sections perpendicular to its fiber axis, that is, lateral fiber cross sections, taken at arbitrary intervals in the same single yarn. The discontinuity of the island component can be confirmed by the method described in the Examples. When the island component is dispersed discontinuously, the island component is spindle-shaped, and therefore, the color developing efficiency due to the light transmitted to the island component is enhanced, brightness is improved, and deep color development is obtained. As described above, the polymer alloy fiber is essentially different from a core-sheath composite fiber in which one island is formed continuously and in the same shape along the fiber axis direction and a sea-island composite fiber in which a plurality of islands are formed continuously and in the same shape along the fiber axis direction. Such a polymer alloy fiber can be obtained, for example, from a polymer alloy composition formed by kneading a polyolefin (A) and a polyester (B) at an arbitrary stage before melt spinning is completed.

Examples of the polyolefin (A) include, but are not limited to, polyethylene, polypropylene, polybutene-1, polymethylpentene and the like. Among them, polypropylene is preferable because it has good moldability and excellent mechanical characteristics, and polymethylpentene is preferable because it has a high melting point and excellent heat resistance, and also has the lowest specific gravity among polyolefins, thus is superior in lightweight property. For clothing applications, polypropylene can be particularly suitably adopted.

The polyolefin (A) may be either a homopolymer or a copolymer with another α-olefin. As the another α-olefin (hereinafter sometimes referred to simply as α-olefin), one kind or two or more kinds may be copolymerized.

The number of carbon atoms of the α-olefin is preferably 2 to 20, and the molecular chain of the α-olefin may be either linear or branched. Specific examples of the α-olefin include, but are not limited to, ethylene, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 3-ethyl-1-hexene, and the like.

The copolymerization ratio of the α-olefin is preferably 20 mol % or less. The copolymerization ratio of the α-olefin is preferably 20 mol % or less because it is possible to obtain a dyeable polyolefin fiber having good mechanical characteristics and heat resistance. The copolymerization ratio of the α-olefin is more preferably 15 mol % or less, and further preferably 10 mol % or less.

The main constituent component of the polyester (B) is a dicarboxylic acid component (B1) and a diol component (B2), preferably at least one dicarboxylic acid component (B1) selected from an aliphatic dicarboxylic acid (B1-1), an alicyclic dicarboxylic acid (B1-2) and an aromatic dicarboxylic acid (B1-3), and preferably at least one diol component (B2) selected from an aliphatic diol (B2-1), an alicyclic diol (B2-2) and an aromatic diol (B2-3). Alternatively, the main constituent component of the polyester (B) is preferably any one selected from an aliphatic oxycarboxylic acid, an alicyclic oxycarboxylic acid, and an aromatic oxycarboxylic acid.

Specific examples of the aliphatic dicarboxylic acid (B1-1) include malonic acid, fumaric acid, maleic acid, succinic acid, itaconic acid, adipic acid, azelaic acid, sebacic acid, 1,11-undecanedicarboxylic acid, 1,12-dodecanedicarboxylic acid, 1,14-tetradecanedicarboxylic acid, 1,18-octadecanedicarboxylic acid, dimer acid and the like, specific examples of the alicyclic dicarboxylic acid (B1-2) include 1,2-cyclohexanedicarboxylic acid, 1,3-cyclohexanedicarboxylic acid, 1,4-cyclohexanedicarboxylic acid, decalin-2,6-dicarboxylic acid and the like, and specific examples of the aromatic dicarboxylic acid (B1-3) include terephthalic acid, phthalic acid, isophthalic acid, 5-sodium sulfoisophthalic acid, 1,5-naphthalenedicarboxylic acid, 2,6-naphthalenedicarboxylic acid, 2,2'-biphenyldicarboxylic acid, 3,3'-biphenyldicarboxylic acid, 4,4'-biphenyldicarboxylic acid, anthracene dicarboxylic acid and the like, but are not limited thereto. Further, specific examples of the aliphatic diol (B2-1) include ethylene glycol, trimethylene glycol, tetramethylene glycol, hexamethylene glycol, diethylene glycol, polyethylene glycol, polypropylene glycol, neopentyl glycol and the like, specific examples of the alicyclic diol (B2-2) include 1,2-cyclohexanedimethanol, 1,3-cyclohexanedimethanol, 1,4-cyclohexanedimethanol, spiroglycol, isosorbide and the like, and specific examples of the aromatic diol (B2-3) include catechol, naphthalene diol, bisphenol and the like, but are not limited thereto. Furthermore, specific examples of the aliphatic oxycarboxylic acid include lactic acid, glycolic acid, α-oxyisobutyric acid, β-oxyisobutyric acid, oxypivalic acid and the like, and specific examples of the aromatic oxycarboxylic acid include salicylic acid, m-oxybenzoic acid, p-oxybenzoic acid, mandelic acid, atrolactic acid and the like, but are not limited thereto.

Specific examples of the polyester (B) include polyethylene terephthalate, polypropylene terephthalate, polybutylene terephthalate, polyhexamethylene terephthalate, polyethylene naphthalate, polyethylene adipate, polypropylene adipate, polybutylene adipate, polyethylene succinate, polypropylene succinate, polybutylene succinate, polyethylene sebacate, polypropylene sebacate, polybutylene sebacate, polycaprolactone, polylactic acid, polyglycolic acid and the like, but are not limited thereto.

The polyester (B) is preferably a copolyester. The molecular orientation and crystallinity of the polyester (B) in the dyeable polyolefin fiber described later can be controlled by the type of copolymerization component and the copolymerization ratio of the copolymerization component, and it is preferable because a fiber and a fibrous structure excellent in color developability and color fastness can be obtained. Specific examples of the copolymerization component include the aliphatic dicarboxylic acid (B1-1), alicyclic dicarboxylic acid (B1-2), aromatic dicarboxylic acid (B1-3), aliphatic diol (B2-1), alicyclic diol (B2-2), aromatic diol (B2-3), aliphatic oxycarboxylic acid, alicyclic oxycarboxylic acid, aromatic oxycarboxylic acid and the like shown above, but are not limited thereto. Either only one kind of these copolymerization components may be used or two or more kinds thereof may be used in combination. Moreover, the copolymerization ratio of the copolymerization component is not particularly limited and can be appropriately selected according to color developability and color fastness of the dyeable polyolefin fiber obtained.

The dyeable polyolefin fiber preferably contains 3.0 to 30.0 parts by weight of the polyester (B) based on 100 parts by weight of the total of the polyolefin (A) and the polyester (B). The content of the polyester (B) is preferably 3.0 parts by weight or more, because the dyeable polyester (B) is scattered in the polyolefin (A), and thus a fiber and a fibrous structure imparted with bright and deep color developability can be obtained. Further, it is preferable because spinning stress applied to the polyester (B) as the island component during melt spinning does not become too high, and the molecular orientation of the dyeable polyester (B) is suppressed in the dyeable polyolefin fiber so that a dye is sufficiently attached, and a fiber and a fibrous structure excellent in color developability can be obtained. The content of the polyester (B) is more preferably 4.0 parts by weight or more, and further preferably 5.0 parts by weight or more. On the other hand, the content of the polyester (B) is preferably 30.0 parts by weight or less, because the spinning stress applied to the polyester (B) as the island component during melt spinning is reduced, but the molecular orientation of the dyeable polyester (B) does not become too low in the dyeable polyolefin fiber so that loss of dye from the polyester (B) is suppressed in reduction cleaning and soaping after dyeing the dyeable polyolefin fiber, and a fiber and a fibrous structure excellent in color developability and level dyeability can be obtained. Further, it is preferable because the loss of dye is suppressed also in rubbing during use and washing, and a fiber and a fibrous structure excellent in color fastness can be obtained. The content of the polyester (B) is more preferably 27.0 parts by weight or less, further preferably 25.0 parts by weight or less, and particularly preferably 20.0 parts by weight or less.

The melt viscosity ratio ($\eta_B/\eta_A$) of the melt viscosity ($\eta_A$) of the polyolefin (A) as the sea component and the melt viscosity ($\eta_B$) of the polyester (B) as the island component is preferably 0.2 to 5.0. The melt viscosity ratio ($\eta_B/\eta_A$) refers to a value measured by the method described in the Examples. When combining different polymers by melt spinning, like polymer alloy type spinning, the spinning stress applied to each of the sea component and the island component during melt spinning changes according to the melt viscosity ratio of the sea component and the island component. Therefore, the molecular orientation of the polymer of each of the sea component and the island component also changes according to the melt viscosity ratio of the sea component and the island component. The dyeable polyolefin fiber is an island component of the dyeable polyolefin fiber, and color developability and color fastness of the dyeable polyolefin fiber can be controlled depending on the level of the molecular orientation of the dyeable polyester (B) so that the melt viscosity ratio of the sea component and the island component is important. $\eta_B/\eta_A$ is preferably 0.2 or more, because the spinning stress applied to the polyester (B) as the island component during melt spinning is reduced, but the molecular orientation of the dyeable polyester (B) does not become too low in the dyeable polyolefin fiber so that loss of dye from the polyester (B) is suppressed in reduction cleaning and soaping after dyeing the dyeable polyolefin fiber, and a fiber and a fibrous structure excellent in color developability and level dyeability can be obtained. Further, it is preferable because the loss of dye is suppressed also in rubbing during use and washing, and a fiber and a fibrous structure excellent in color fastness can be obtained. $\eta_B/\eta_A$ is more preferably 0.3 or more, further preferably 0.5 or more, and particularly preferably 0.7 or more. On the other hand, $\eta_B/\eta_A$ is preferably 5.0 or less, because spinning stress applied to the polyester (B) as the island component during melt spinning does not become too high, and the molecular orientation of the dyeable polyester (B) is suppressed in the dyeable polyolefin fiber so that a dye is sufficiently attached, and a fiber and a fibrous structure excellent in color developability can be obtained. $\eta_B/\eta_A$ is more preferably 3.3 or less, further preferably 2.0 or less, and particularly preferably 1.4 or less.

As described above, the molecular orientation and crystallinity of the polyester (B) in the dyeable polyolefin fiber described later can be controlled by the type of copolymerization component and the copolymerization ratio of the copolymerization component of the polyester (B). Therefore, the preferable range of the melt viscosity ratio ($\eta_B/\eta_A$) of the melt viscosity ($\eta_A$) of the polyolefin (A) as the sea component and the melt viscosity ($\eta_B$) of the polyester (B) as the island component changes, according to the type of copolymerization component and the copolymerization ratio of the copolymerization component of the polyester (B). For example, in polyethylene terephthalate, it is preferably 0.2 to 0.9, more preferably 0.3 to 0.8, further preferably 0.4 to 0.7, and particularly preferably 0.5 to 0.6. Further, in polyethylene terephthalate copolymerized with 30 mol % of isophthalic acid (IPA), $\eta_B/\eta_A$ is preferably 0.2 to 5.0, more preferably 0.3 to 3.3, further preferably 0.5 to 2.0, and particularly preferably 0.7 to 1.4.

The dyeable polyolefin fiber may be one that has been modified through various methods by adding minor additives. Specific examples of the secondary additives include, but are not limited to, a compatibilizer, a plasticizer, an antioxidant, an ultraviolet absorber, an infrared ray absorbent, a fluorescent brightening agent, a mold releasing agent, an antibacterial agent, a nuclear formation agent, a thermal stabilizer, an antistatic agent, a color protection agent, an adjustor, a delustering agent, an antifoaming agent, an antiseptic agent, a gelatinizer, latex, a filler, ink, a coloring agent, a dye, a pigment, a perfume and the like. These minor additives may be used alone or in combination of two or more.

The polyester (B) in the dyeable polyolefin fiber has an orientation parameter, as determined by Raman spectroscopy, of 1.1 to 10.0. The orientation parameter of the polyester (B) in the dyeable polyolefin fiber as determined by Raman spectroscopy refers to a value measured by the method described in Examples. The orientation parameter is an index of the molecular orientation of the polymer, and the larger the value, the higher the molecular orientation. When the orientation parameter of the polyester (B) in the dyeable polyolefin fiber is 1.1 or more, the molecular orientation of the dyeable polyester (B) does not become too low in the dyeable polyolefin fiber so that loss of dye from the polyester (B) is suppressed in reduction cleaning and soaping after dyeing the dyeable polyolefin fiber, and a fiber and a fibrous structure excellent in color developability and level dyeability can be obtained. Further, the loss of dye is suppressed also in rubbing during use and washing, and a fiber and a fibrous structure excellent in color fastness can be obtained. The orientation parameter of the polyester (B) in the dyeable polyolefin fiber is more preferably 1.5 or more, further preferably 2.0 or more, and particularly preferably 2.5 or more. On the other hand, when the polyester (B) in the dyeable polyolefin fiber has an orientation parameter of 10.0 or less, the molecular orientation of the dyeable polyester (B) is suppressed in the dyeable polyolefin fiber so that a dye is sufficiently attached, and a fiber and a fibrous structure excellent in color developability can be obtained. The orientation parameter of the polyester (B) in the dyeable polyolefin fiber is more preferably 9.0 or less, further preferably 8.0 or less, and particularly preferably 7.0 or less.

The polyester (B) in the dyeable polyolefin fiber preferably has a crystallinity, as determined by Raman spectroscopy, of 1 to 40%. The crystallinity of the polyester (B) in the dyeable polyolefin fiber as determined by Raman spectroscopy refers to a value measured by the method described in Examples. The polyester (B) in the dyeable polyolefin fiber preferably has a crystallinity of 1% or more, because loss of dye from the polyester (B) is suppressed in reduction cleaning and soaping after dyeing the dyeable polyolefin fiber, and a fiber and a fibrous structure excellent in color developability and level dyeability can be obtained. Further, it is preferable because the loss of dye is suppressed also in rubbing during use and washing, and a fiber and a fibrous structure excellent in color fastness can be obtained. The crystallinity of the polyester (B) in the dyeable polyolefin fiber is more preferably 5% or more, further preferably 10% or more, and particularly preferably 15% or more. On the other hand, the polyester (B) in the dyeable polyolefin fiber preferably has a crystallinity of 40% or less, because a dye is sufficiently attached to an amorphous part of the dyeable polyester (B) in the dyeable polyolefin fiber, and a fiber and a fibrous structure excellent in color developability can be obtained. The crystallinity of the polyester (B) in the dyeable polyolefin fiber is more preferably 35% or less, further preferably 33% or less, and particularly preferably 30% or less.

The fineness of the dyeable polyolefin fiber as a multifilament is not particularly limited and can be appropriately selected according to the application and required characteristics, but is preferably 10 to 3,000 dtex. The fineness refers to a value measured by the method described in Examples. The fineness of the dyeable polyolefin fiber is preferably 10 dtex or more, because in addition to low thread breakage frequency and good process passability, such a fiber will have less fluff during use, and superior durability. The fineness of the dyeable polyolefin fiber is more preferably 30 dtex or more, and further preferably 50 dtex or more. On the other hand, the fineness of the dyeable polyolefin fiber is preferably 3,000 dtex or less, because the flexibility of the fiber and the fibrous structure will not be impaired. The fineness of the dyeable polyolefin fiber is more preferably 2,500 dtex or less, and further preferably 2,000 dtex or less.

The single yarn fineness of the dyeable polyolefin fiber is not particularly limited and can be appropriately selected according to the application and required characteristics, but is preferably 0.5 to 20 dtex. The single yarn fineness refers to a value obtained by dividing the fineness measured by the method described in Examples by the number of single yarns. The single yarn fineness of the dyeable polyolefin fiber is preferably 0.5 dtex or more, because in addition to low thread breakage frequency and good process passability, such a fiber will have less fluff during use, and superior durability. Further, it is preferable because spinning stress applied to the polyester (B) as the island component during melt spinning does not become too high, and the molecular orientation of the dyeable polyester (B) is suppressed in the dyeable polyolefin fiber so that a dye is sufficiently attached, and a fiber and a fibrous structure excellent in color developability can be obtained. The single yarn fineness of the dyeable polyolefin fiber is more preferably 0.6 dtex or more, and further preferably 0.8 dtex or more. On the other hand, the single yarn fineness of the dyeable polyolefin fiber is preferably 20 dtex or less, because the flexibility of the fiber and the fibrous structure will not be impaired. The single yarn fineness of the dyeable polyolefin fiber is more preferably 15 dtex or less, and further preferably 12 dtex or less.

The number of filaments constituting the dyeable polyolefin fiber is not particularly limited and can be appropriately selected according to the application and required characteristics, but is preferably 3 to 250. The number of filaments of the dyeable polyolefin fiber is preferably 3 or more, because the flexibility of the fiber and the fibrous structure will not be impaired. The number of filaments of the dyeable polyolefin fiber is more preferably 10 or more, further preferably 15 or more, and particularly preferably 20 or more. On the other hand, the number of filaments of the dyeable polyolefin fiber is preferably 250 or less, because spinning stress applied to the polyester (B) as the island component during melt spinning does not become too high, and the molecular orientation of the dyeable polyester (B) is suppressed in the dyeable polyolefin fiber so that a dye is sufficiently attached, and a fiber and a fibrous structure excellent in color developability can be obtained. The number of filaments of the dyeable polyolefin fiber is more preferably 200 or less, further preferably 150 or less, and particularly preferably 100 or less.

The strength of the dyeable polyolefin fiber is not particularly limited and can be appropriately selected according to the application and required properties, but is preferably 1.0 to 6.0 cN/dtex from the viewpoint of mechanical characteristics. The strength refers to a value measured by the method described in Examples. The strength of the dyeable polyolefin fiber is preferably 1.0 cN/dtex or more, because such a fiber will have less fluff during use, and superior durability. The strength of the dyeable polyolefin fiber is more preferably 1.5 cN/dtex or more, and further preferably 2.0 cN/dtex or more. On the other hand, the strength of the dyeable polyolefin fiber is preferably 6.0 cN/dtex or less, because the flexibility of the fiber and the fibrous structure will not be impaired.

The degree of elongation of the dyeable polyolefin fiber is preferably 10 to 80%. The degree of elongation refers to a value measured by the method described in Examples. When the degree of elongation of the dyeable polyolefin fiber is 10% or more, the molecular orientation of the dyeable polyester (B) is suppressed in the dyeable polyolefin fiber so that a dye tends to be sufficiently attached, and a fiber and a fibrous structure excellent in color developability tends to be obtained. Further, the fiber and the fibrous structure will have good wear resistance, less fluff during use, and good durability. The degree of elongation of the dyeable polyolefin fiber is more preferably 15% or more, further preferably 20% or more, and particularly preferably 25% or more. On the other hand, when the degree of elongation of the dyeable polyolefin fiber is 80% or less, the molecular orientation of the dyeable polyester (B) does not become too low in the dyeable polyolefin fiber so that loss of dye from the polyester (B) is suppressed in reduction cleaning and soaping after dyeing the dyeable polyolefin fiber, and a fiber and a fibrous structure excellent in color developability and level dyeability tends to be obtained. Further, the loss of dye is suppressed also in rubbing during use and washing, and a fiber and a fibrous structure excellent in color fastness tends to be obtained. The degree of elongation of the dyeable polyolefin fiber is more preferably 70% or less, further preferably 65% or less, and particularly preferably 60% or less.

The dyeable polyolefin fiber is not particularly limited with respect to the cross-sectional shape of the fiber, and the cross-sectional shape can be appropriately selected according to the application and required characteristics, and may be a perfect circular cross section or non-circular cross section. Specific examples of the non-circular cross-section include, but are not limited to, multilobar, polygonal, flattened, elliptic, C-shaped, H-shaped, S-shaped, T-shaped, W-shaped, X-shaped, Y-shaped, grid-like, double-crossed, hollow and the like.

The dyeable polyolefin fiber is not particularly limited with respect to the form of the fiber, and may be any form such as monofilament, multifilament or staple.

The dyeable polyolefin fiber can be subjected to false twisting, twisting and the like similarly to general fibers, and can be treated in the same manner as general fibers for weaving and knitting.

The form of the fibrous structure including the dyeable polyolefin fiber is not particularly limited, and can be processed into woven fabric, knitted fabric, pile fabric, nonwoven fabric, spun yarn, wadding or the like according to known methods. Further, the fibrous structure including the dyeable polyolefin fiber may be of any weave or knit structure, and plain weaving, diagonal weaving, sateen weaving or their modified weaving, warp knitting, weft knitting, circular knitting, lace stitching or their modified knitting or the like can be suitably adopted.

The dyeable polyolefin fiber may be combined with other fibers by mixed weaving or mixed knitting when forming a fibrous structure, or may be formed into combined filament yarns with other fibers, followed by forming them into a fibrous structure.

Next, a method of producing the dyeable polyolefin fiber will be described below.

As a method of producing the dyeable polyolefin fiber, a known melt spinning method, drawing method and false twisting method can be adopted.

It is preferable that the polyolefin (A) and the polyester (B) are dried to a water content of 0.3% by weight or less before performing melt spinning. A water content of 0.3% by weight or less is preferable because it does not foam due to water during the melt spinning, allowing the spinning to be performed stably. Further, it is preferable because hydrolysis during spinning can be suppressed, and deterioration of mechanical characteristics and deterioration of color tone of the resulting dyeable polyolefin fiber are suppressed. The water content is more preferably 0.2% by weight or less, and further preferably 0.1% by weight or less.

When performing polymer alloy type spinning, examples of a method of discharging from a spinneret to form a fiber yarn include the following, but the method is not limited thereto. A first example is a method in which chips combined by melt-kneading polyolefin (A) and polyester (B) with an extruder or the like in advance are dried as required, then the dried chips are fed to a melt spinning machine to be melted, and the melt is weighed by a metering pump, then the melt is introduced into a spinning pack heated in a spin-block, and the molten polymer is filtered in the spinning pack and then discharged from a spinneret to form a fiber yarn. A second example is a method in which chips are dried as required, polyolefin (A) and polyester (B) are mixed in the state of chips, then the mixed chips are fed to a melt spinning machine to be melted, and the melt is weighed by a metering pump, then the melt is introduced into a spinning pack heated in a spin-block, and the molten polymer is filtered in the spinning pack and then discharged from a spinneret to form a fiber yarn.

The fiber yarn discharged from the spinneret is cooled and solidified by a cooling device, taken up by a first godet roller, and wound up by a winder through a second godet roller to obtain a wound yarn. A heating cylinder or heat insulation cylinder with a length of 2 to 50 cm may be installed below the spinneret as required to improve spinning operability, productivity, and mechanical characteristics of the fiber. In addition, an oil feeder may be used to supply oil to the fiber yarn or an entangling device may be used to entangle the fiber yarn.

The spinning temperature in melt spinning can be appropriately selected according to the melting points and heat resistance of the polyolefin (A) and the polyester (B), but is preferably 220 to 320° C. A spinning temperature of 220° C. or more is preferable because the elongation viscosity of the fiber yarn discharged from the spinneret is sufficiently low to ensure stable discharge and also because the spinning tension is not excessively increased and thread breakage can be suppressed. The spinning temperature is more preferably 230° C. or more, and further preferably 240° C. or more. On the other hand, a spinning temperature of 320° C. or less is preferable because heat decomposition during spinning can be suppressed and deterioration of mechanical characteristics and coloring of the resulting dyeable polyolefin fiber can be suppressed. The spinning temperature is more preferably 300° C. or less, and further preferably 280° C. or less.

The spinning speed in melt spinning can be appropriately selected according to the composite ratio of the polyolefin (A) and the polyester (B), the spinning temperature, and the like, but is preferably 500 to 6,000 m/min. A spinning speed of 500 m/min or more is preferable because a running yarn is stabilized and thread breakage can be suppressed. The spinning speed in a two-step process is more preferably 1,000 m/min or more, and further preferably 1,500 m/min or more. On the other hand, a spinning speed of 6,000 m/min or less is preferable because the spinning stress applied to the polyester (B) as the island component during melt spinning does not become too high, and the molecular orientation of the dyeable polyester (B) is suppressed in the dyeable polyolefin fiber so that a dye is sufficiently attached, and a fiber and a fibrous structure excellent in color developability can be obtained. The spinning speed in the two-step process is more preferably 4,500 m/min or less, and further preferably 4,000 m/min or less. Further, the spinning speed in a one-step process in which spinning and drawing are simultaneously performed without winding up is preferably set to 500 to 5,000 m/min for a lower speed roller and 2,000 to 6,000 m/min for a higher speed roller. Spinning speeds of the lower speed roller and the higher speed roller within the above ranges are preferable because the running yarn is stabilized and thread breakage can be suppressed and thus stable spinning can be performed. The spinning speed in the one-step process is more preferably set to 1,000 to 4,500 m/min for the lower speed roller and 2,500 to 5,500 m/min for the higher speed roller, and further preferably 1,500 to 4,000 m/min for the lower speed roller and 3,000 to 5,000 m/min for the higher speed roller.

When performing drawing by a one-step process or a two-step process, it may be performed by either a single stage drawing process or a multistage drawing process including two or more stages. The heating method in drawing is not particularly limited as long as it is a device that can directly or indirectly heat the running yarn. Specific examples of the heating method include, but are not limited to, a heating roller, a heating pin, a heating plate, liquid bath such as warm water and hot water, gas bath such as hot air and steam, laser and the like. These heating methods may be used alone or in combination. As the heating method, contact with a heating roller, contact with a heating pin, contact with a hot plate, and immersion in a liquid bath can be suitably adopted, from the viewpoint of control of the heating temperature, uniform heating of the running yarn, and not complicating the device.

The drawing temperature when performing drawing can be appropriately selected according to the melting points of the polyolefin (A) and the polyester (B), the strength and degree of elongation of a fiber after drawing and the like, and is preferably 20 to 150° C. A drawing temperature of 20° C. or more is preferable because the yarn to be fed to drawing is sufficiently preheated, uniform heat deformation is achieved during drawing, and generation of fluff and fineness unevenness can be suppressed so that a high-quality fiber and a fibrous structure with excellent uniformity in the longitudinal direction of a fiber and excellent level dyeability can be obtained. The drawing temperature is more preferably 30° C. or more, and further preferably 40° C. or more. On the other hand, a drawing temperature of 150° C. or less is preferable because it is possible to suppress welding and thermal decomposition of fibers due to their contact with a heating roller, leading to good process passability and high quality. In addition, it is preferable because the slipperiness of the fiber on the drawing roller is good, thus thread breakage is suppressed, and stable drawing can be performed. The drawing temperature is more preferably 145° C. or less, and further preferably 140° C. or less. In addition, heat setting may be performed at 60 to 150° C. as required.

The draw ratio when performing drawing can be appropriately selected according to the degree of elongation of a fiber before drawing, the strength and degree of elongation of a fiber after drawing and the like, and is preferably 1.02 to 7.0 times. A draw ratio of 1.02 times or more is preferable because drawing can improve mechanical characteristics such as the strength and degree of elongation of a fiber. In addition, it is preferable because the molecular orientation of the dyeable polyester (B) does not become too low in the dyeable polyolefin fiber so that loss of dye from the polyester (B) is suppressed in reduction cleaning and soaping after dyeing the dyeable polyolefin fiber, and a fiber and a fibrous structure excellent in color developability and level dyeability can be obtained. Further, it is preferable because the loss of dye is also suppressed in rubbing during use and washing, and a fiber and a fibrous structure excellent in color fastness can be obtained. The draw ratio is more preferably 1.2 times or more, and further preferably 1.5 times or more. On the other hand, a draw ratio of 7.0 or less is preferable because thread breakage during drawing is suppressed, and stable drawing can be performed. Further, it is preferable because the molecular orientation of the dyeable polyester (B) is suppressed in the dyeable polyolefin fiber so that a dye is sufficiently attached, and a fiber and a fibrous structure excellent in color developability can be obtained. The draw ratio is more preferably 6.0 times or less, and further preferably 5.0 times or less.

The drawing speed when performing drawing can be appropriately selected according to whether the drawing method is a one-step process or a two-step process and the like. In the one-step process, the speed of the higher speed roller of the above-mentioned spinning speed corresponds to the drawing speed. The drawing speed when performing drawing by the two-step process is preferably 30 to 1,000 m/min. A drawing speed of 30 m/min or more is preferable because a running yarn is stabilized and thread breakage can be suppressed. The drawing speed when performing drawing by the two-step process is more preferably 50 m/min or more, and further preferably 100 m/min or more. On the other hand, a drawing speed of 1,000 m/min or less is preferable because thread breakage during drawing is suppressed, and stable drawing can be performed. The drawing speed when performing drawing by the two-step process is more preferably 900 m/min or less, and further preferably 800 m/min or less.

When performing false twisting, so-called Buleria processing using both a first stage heater and a second stage heater can be appropriately selected, in addition to so-called Woolly processing using only a first heater.

Examples of a device to use for false twisting include a false twisting machine equipped with FR (feed rollers), 1DR (first draw roller) heater, cooling plate, false twister, 2DR (second draw roller), 3DR (third draw roller), entangling nozzle, 4DR (fourth draw roller), and winder.

The processing ratio between FR and 1DR can be appropriately selected according to the degree of elongation of a fiber to use for false twisting and the degree of elongation of a false-twisted fiber, but is preferably 1.0 to 2.0 times.

The heating method of the heater may be either a contact type or a non-contact type. The heater temperature can be appropriately selected according to the melting points of the polyolefin (A) and the polyester (B), the strength and degree of elongation of a false-twisted fiber and the like, and the heater temperature of the contact type is preferably 90° C. or more, and the heater temperature of the non-contact type is preferably 150° C. or more. A heater temperature of the contact type of 90° C. or more, or a heater temperature of the non-contact type of 150° C. or more is preferable because the yarn to be fed to false twisting is sufficiently preheated, uniform heat deformation accompanied by drawing is achieved, and generation of fluff and fineness unevenness can be suppressed so that a high-quality fiber and a fibrous structure with excellent uniformity in the longitudinal direction of a fiber and excellent level dyeability can be obtained. The heater temperature of the contact type is more preferably 100° C. or more, and further preferably 110° C. or more. The heater temperature of the non-contact type is more preferably 200° C. or more, and further preferably 250° C. or more. The upper limit of the heater temperature may be a temperature at which an undrawn yarn or drawn yarn to use for false twisting does not fuse in the heater.

The false twister is preferably a friction false twisting type, and examples thereof include a friction disc type, a belt nip type and the like, but are not limited thereto. Among them, the friction disc type is preferable, and it is preferable to fully constitute the disc material by ceramics because false twisting can be stably performed by fully constituting the disc material by ceramics, even when the friction disc type is operated for a long time. The ratio between 2DR and 3DR and the ratio between 3DR and 4DR can be appropriately selected according to the strength and degree of elongation of a false-twisted fiber and the like, but is preferably 0.9 to 1.0 times. Between 3DR and 4DR, entanglement may be provided by an entanglement nozzle or oil may be added by an oil guide to improve process passability of the false-twisted fiber.

The processing speed when performing false twisting can be appropriately selected, but is preferably 200 to 1,000 m/min. A processing speed of 200 m/min or more is preferable because a running yarn is stabilized and thread breakage can be suppressed. The processing speed is more preferably 300 m/min or more, and further preferably 400 m/min or more. On the other hand, a processing speed of 1,000 m/min or less is preferable because thread breakage during false twisting is suppressed, and stable false twisting can be performed. The processing speed is more preferably 900 m/min or less, and further preferably 800 m/min or less.

Dyeing may be performed in the state of either the fiber or the fibrous structure, as required. A disperse dye or a cationic dye can be suitably adopted as the dye. While the polyolefin (A) constituting the dyeable polyolefin fiber is hardly dyed with a dye, the polyester (B) is dyeable so that it is possible to obtain a fiber and a fibrous structure having bright and deep color developability.

The dyeing method is not particularly limited, and a cheese dyeing machine, a jet dyeing machine, a drum dyeing machine, a beam dyeing machine, a jigger, a high pressure jigger and the like can be suitably adopted according to known methods.

There is no particular limitation on dye concentration and dyeing temperature, and a known method can be suitably adopted. In addition, as required, refining may be performed before dyeing process, and reduction cleaning may be performed after the dyeing process.

The dyeable polyolefin fiber and a fibrous structure including the same are imparted with bright and deep color developability to the lightweight polyolefin fiber, and is also excellent in terms of color fastness and level dyeability. Therefore, in addition to the applications for which conventional polyolefin-based fibers are used, it can be developed to clothing applications and applications requiring lightweight property and color developability. Examples of the applications for which conventional polyolefin-based fibers are used include interior applications such as tile carpets, household carpets and automobile mats, bedding such as mattress wadding and pillow fillers, general material applications such as ropes, protective nets, filter fabrics, narrow tapes, braids and chair upholstery, and the like, but are not limited thereto. Further, expanded examples of applications include applications such as general clothing such as women's wear, men's wear, lining, underwear, down jackets, vests, inner garments, and outer garments; sports clothing such as wind breakers, outdoor sports wear, skiing wear, golf wear, and swimsuits; bedding such as outer fabrics of mattress, mattress covers, blankets, outer fabrics of blankets, blanket covers, pillow covers, and sheets; interior materials such as tablecloth and curtains; and other materials such as belts, bags, sewing threads, sleeping bags, and tents, but are not limited thereto.

EXAMPLES

Hereinafter, our fibers and fibrous structures will be described in more detail with reference to the Examples. Characteristic values in the Examples were determined by the following methods.

A. Composite Ratio

Based on 100 parts by weight of the total of polyolefin (A) and polyester (B) used as raw materials for a dyeable polyolefin fiber, A/B [parts by weight] was calculated as the composite ratio.

B. Melt Viscosity Ratio

For polyolefin (A) and polyester (B) vacuum-dried in advance, using Capilograph 1B manufactured by Toyo Seiki Seisaku-sho, Ltd., the measurement was performed after allowing them to stay for 5 minutes under a nitrogen atmosphere using a capillary with a pore diameter of 1.0 mm and a pore length of 10 mm. The measurement temperature was the same as the spinning temperature in Examples described later, and the apparent viscosity (Pa·s) at a shear rate of 1216 sec$^{-1}$ was taken as the melt viscosity (Pa·s). The measurement was performed three times for each sample, and the average value thereof was taken as the melt viscosity. The melt viscosities of the polyolefin (A) and the polyester (B) were taken as $\eta_A$ and $\eta_B$, respectively, and the melt viscosity ratio was calculated using the following formula:

$$\text{Melt viscosity ratio } (\eta_B/\eta_A) = \eta_B/\eta_A.$$

C. Fineness

In an environment of a temperature of 20° C. and a humidity of 65% RH, 100 m of a fiber obtained in Example was wound into a hank using an electric sizing reel manufactured by INTEC Inc. The weight of the obtained hank was measured and its fineness (dtex) was calculated by the following equation. The measurement was performed five times for each sample, and the average value thereof was taken as the fineness.

$$\text{Fineness (dtex)} = \text{Weight of 100 m of fiber (g)} \times 100.$$

D. Strength, Degree of Elongation

The strength and the degree of elongation were calculated according to JIS L 1013: 2010 (Testing methods for man-made filament yarns) 8.5.1 using the fiber obtained in Example as a sample. In an environment of a temperature of 20° C. and a humidity of 65% RH, a tensile test was performed using a TENSILON UTM-III-100 manufactured by ORIENTEC Corporation under the conditions of an initial sample length of 20 cm and a tension speed of 20 cm/min. The strength (cN/dtex) was calculated by dividing the stress (cN) at the point showing the maximum load by the fineness (dtex), and the degree of elongation (%) calculated by the following equation using the elongation (L1) at the point showing the maximum load and the initial sample length (L0). The measurement was performed ten times for each sample, and the average value thereof taken as the strength and the degree of elongation.

$$\text{Degree of elongation (\%)} = \{(L1-L0)/L0\} \times 100.$$

E. Discontinuity of Island Component

After embedding a fiber obtained in Example with an epoxy resin, the fiber was cut together with the epoxy resin with an Ultramicrotome LKB-2088 manufactured by LKB in the direction perpendicular to the fiber axis, and thus an ultrathin section having a thickness of about 100 nm was obtained. The obtained ultrathin section was stained by holding it in a vapor phase of solid ruthenium tetroxide for about 4 hours at ambient temperature, then the stained face cut with the Ultramicrotome, and thus an ultrathin section stained with ruthenium tetroxide was prepared. For the stained ultrathin section, its cross section perpendicular to the fiber axis, that is, its lateral fiber cross section was observed under the condition with an acceleration voltage of 100 kV and a microscopic photograph of the lateral fiber cross section taken using a transmission electron microscope (TEM) H-7100FA manufactured by Hitachi Ltd. The observation was carried out at magnifications of 300, 500, 1000, 3000, 5000, 10000, 30000, and 50000, and when taking a microscopic photograph, the lowest magnification with which 100 or more island components could be observed was selected.

Regarding the discontinuity of the island component, five microscopic photographs of the lateral fiber cross section were taken at arbitrary intervals of at least 10,000 times the single yarn diameter in the same single yarn, and when the respective lateral fiber cross sections were different in the number of island components and the shape of the sea-island structure, it was assumed that the island component was discontinuous, and when the island component was discontinuous, this was denoted by "A," and when the island component was not discontinuous, this was denoted by "C."

F. Orientation Parameter

Using the fiber obtained in Example as a sample, the measurement was performed under the following conditions, and each polarization Raman spectrum was obtained under the parallel condition when the polarization direction coincides with the fiber axis and the vertical condition when the polarization direction is orthogonal. When there was a Raman band around 1615 cm$^{-1}$ attributed to C=C stretching vibration of polyester (B), the orientation parameter was calculated using the following equation, taking the Raman band intensity in the parallel condition as $I_{1615}$ parallel, and the Raman band intensity in the vertical condition as $I_{1615}$ vertical. When there was no Raman band around 1615 cm$^{-1}$ attributed to C=C stretching vibration of polyester (B), the orientation parameter was calculated using the following equation, in the Raman band around 1730 cm$^{-1}$ attributed to C=O stretching vibration of polyester (B), taking the Raman band intensity in the parallel condition as $I_{1730}$ parallel, and the Raman band intensity in the vertical condition as $I_{1730}$ vertical. The measurement was performed five times for each sample, and the average value thereof was taken as the orientation parameter.

Orientation parameter=$I_{1615}$ parallel/$I_{1615}$ vertical, or Orientation parameter=$I_{1730}$ parallel/$I_{1730}$ vertical Device: inVia manufactured by RENISHAW
Measurement mode: Microscopic Raman
Objective lens: ×20
Beam diameter: 5 μm
Light source: YAG 2nd 532 nm Line
Laser power: 100 mW
Diffraction grating: Single −3000 gr/mm
Slit: 65 μm
Detector: CCD 1024×256 pixels.

G. Crystallinity

A polarized Raman spectrum was obtained in the same manner as in the above F except that laser light polarized parallel to the fiber axis was incident and a scattered light measured without an analyzer. The crystallinity was calculated using the following equation, taking full width at half maximum of the Raman band around 1730 cm$^{-1}$ attributed to the C=O stretching vibration of polyester (B) as $\Delta v_{1730}$. The reduced density p in the following equation was empirically derived from the half-widths of various PET samples. The measurement was performed five times for each sample, and the average value thereof was taken as the crystallinity.

Reduced density $\rho(g/cm^3)=(305-\Delta v_{1730})/209$

Crystallinity (%)=$100\times(\rho-1.335)/(1.455-1.335)$.

H. L* Value (after finishing set): brightness, ΔE (color loss in process)

Using the fiber obtained in Example as a sample, about 2 g of cylindrical knit was prepared using a circular knitting machine NCR-BL manufactured by Eiko Industrial Co., Ltd. (caliber: 3.5 inches (8.9 cm), 27 gauges), and then the cylindrical knit was scoured at 80° C. for 20 minutes in an aqueous solution containing 1.5 g/L of sodium carbonate and 0.5 g/L of a surfactant Gran up US-20 manufactured by Meisei Chemical Works, Ltd., rinsed with running water for 30 minutes, and dried in a hot air dryer at 60° C. for 60 minutes. The scoured cylindrical knit was subjected to dry heat setting at 135° C. for 1 minute, and the dry heat set cylindrical knit dyed at a bath ratio of 1:100 at 130° C. for 45 minutes in a dyeing solution in which 1.3% by weight of Kayalon Polyester Blue UT-YA produced by Nippon Kayaku Co., Ltd. was added as a disperse dye to adjust pH to 5.0, and then rinsed with running water for 30 minutes, and dried in a hot air dryer at 60° C. for 60 minutes. The dyed cylindrical knit was subjected to reduction cleaning at a bath ratio of 1:100 at 80° C. for 20 minutes in an aqueous solution containing 2 g/L of sodium hydroxide, 2 g/L of sodium dithionite, and 0.5 g/L of a surfactant Gran up US-20 manufactured by Meisei Chemical Works, Ltd., then rinsed with running water for 30 minutes, and dried in a hot air dryer at 60° C. for 60 minutes. The reduction cleaned cylindrical knit was subjected to dry heat setting at 135° C. for 1 minute to perform finish setting.

When a cationic dyeable polyester is used as the polyester (B), the dry heat set cylindrical knit was dyed at a bath ratio of 1:100 at 120° C. for 40 minutes in a dyeing solution in which 1.3% by weight of Kayacryl Blue 2RL-ED produced by Nippon Kayaku Co., Ltd. was added as a cationic dye to adjust pH to 4.0, and then rinsed with running water for 30 minutes, and dried in a hot air dryer at 60° C. for 60 minutes. The dyed cylindrical knit was subjected to soaping at a bath ratio of 1:100 at 80° C. for 20 minutes in an aqueous solution containing 2.0 g/L of a surfactant Laccol PSK manufactured by Meisei Chemical Works, Ltd., then rinsed with running water for 30 minutes, and dried in a hot air dryer at 60° C. for 60 minutes. The cylindrical knit after soaping was subjected to dry heat setting at 135° C. for 1 minute to perform finish setting.

Using the dyed cylindrical knit and the finish-set cylindrical knit as samples, color tone (L* value, a* value, b* value) was measured using a spectrophotometer CM-3700d manufactured by Minolta with a D65 light source at a view angle of 10° under SCE (specular component excluded) optical conditions. The measurement was performed three times for each sample, and the average value thereof adopted. Further, based on the color tone measurement result, ΔE was calculated using the following equation:

$\Delta L^* = L^*$ (after finishing set)-$L^*$(after dyeing)

$\Delta a^* = a^*$ (after finishing set)-$a^*$ (after dyeing)

$\Delta b^* = b^*$ (after finishing set)-$b^*$ (after dyeing)

$\Delta E = \{(\Delta L^*)^2 + (\Delta a^*)^2 + (\Delta b^*)^2\}^{0.5}$.

I. Color Developability

The finish-set cylindrical knit prepared in the above H was evaluated for color developability according to four level criteria S, A, B, and C based on a consultation by five examiners having 5-year or longer experience in quality evaluation. The evaluation shows that S is the best, the level lowers with A and B in order, and C is the worst:

S: Sufficient bright and deep color is developed
A: Almost sufficient bright and deep color is developed
B: Little bright and deep color is developed
C: No bright and deep color is developed.

J. Level Dyeability

The finish-set cylindrical knit prepared in the above H was evaluated for level dyeability according to four level criteria S, A, B, and C based on a consultation by five examiners having 5-year or longer experience in quality evaluation. The evaluation shows that S is the best, the level lowers with A and B in order, and C is the worst:

S: Dyed highly uniformly with no dyeing specks detected
A: Dyed nearly uniformly with almost no dyeing specks detected
B: Dyed little uniformly with slight dyeing specks detected
C: Not dyed uniformly with clear dyeing specks detected.

K. Rubbing Fastness (Staining)

Rubbing fastness evaluation was performed according to the drying test specified in 9.2 rubbing tester type II (Gakushin-Type) method of JIS L 0849: 2013 (Test methods for color fastness to rubbing). Using a Gakushin-type rubbing tester RT-200 manufactured by Daiei Kagaku Seiki Mfg. Co., Ltd., the finish-set cylindrical knit prepared in the above H as a sample was subjected to rubbing treatment along with a piece of attached white cotton cloth (Cotton 3-1) specified in JIS L 0803: 2011, then the degree of staining of the white cotton cloth was determined with reference to a gray scale to assess staining as specified in JIS L 0805: 2005, and the rubbing fastness (staining) was thereby evaluated.

L. Washing Fastness (Discoloration, Liquid Staining)

Washing fastness evaluation was performed according to A-2 of JIS L 0844: 2011 (Test methods for color fastness to washing and laundering). Using a Laundermeter tester manufactured by Daiei Kagaku Seiki Mfg. Co., Ltd., the finish-set cylindrical knit prepared in the above H as a sample was subjected to laundering treatment along with a piece of attached white cotton cloth (Cotton 3-1, Nylon 7-1) specified in JIS L 0803: 2011, then the degree of discoloration of the sample was determined with reference to a discoloration gray scale as specified in JIS L 0804: 2004, and the washing fastness (discoloration) was thereby evaluated. In addition, the degree of staining of the washing liquid after the laundering treatment was determined with reference to a staining gray scale as specified in JIS L 0805: 2005, and the washing fastness (liquid staining) was thereby evaluated.

M. Color Bleeding (Staining)

Color bleeding evaluation was performed according to the Daimaru method. A test piece cut into 2.5 cm×3.0 cm by cutting the finish-set cylindrical knit prepared in the above H was sewn on a white cotton cloth (Cotton 3-1) specified in JIS L 0803: 2011 cut into 2.5 cm×20 cm. Subsequently, 2.0 cm of the test piece was vertically dipped in a beaker containing a 0.05% aqueous solution of a nonionic surfactant, and allowed to stand at room temperature for 2 hours. Thereafter, the beaker was removed, and the test piece naturally dried as it was, then the degree of staining of the white cotton cloth was determined with reference to a staining gray scale as specified in JIS L 0805: 2005, and the color bleeding (staining) was thereby evaluated.

Example 1

90 parts by weight of polypropylene (PP) (Novatec MA2 manufactured by Japan Polypropylene Corporation) and 10 parts by weight of polyethylene terephthalate copolymerized with 30 mol % of isophthalic acid (IPA) as a dicarboxylic acid component were added, and kneading performed at a kneading temperature of 280° C. using a twin-screw extruder. The strand discharged from the twin screw extruder was cooled in water and then cut by a pelletizer at intervals of about 5 mm to obtain pellets. The pellets obtained were vacuum-dried at 150° C. for 12 hours and then supplied to an extruder type melt spinning machine in which they were melted and discharged through a spinneret (discharge hole size 0.18 mm, discharge hole length 0.23 mm, number of holes 48, round holes) at a spinning temperature of 285° C. and a discharging rate of 32.5 g/min to obtain a spun yarn. The spun yarn was cooled in a cooling air flow with an air temperature of 20° C. and a flow speed of 25 m/min, converged while supplying oil from an oil feeder, and taken up by a first godet roller rotating at 1,250 m/min, then wound up by a winder rotating at 1,250 m/min via a second godet roller rotating at 1,250 m/min to obtain an undrawn yarn of 260 dtex-48f. The undrawn yarn obtained was secondarily drawn under the conditions of a first hot roller temperature of 30° C., a second hot roller temperature of 30° C., and a third hot roller temperature of 130° C., and drawn under the condition of a total draw ratio of 3.1 to obtain a drawn yarn of 84dtex-48f. Evaluation results of the fiber characteristics and the fabric characteristics of the fiber obtained are shown in Table 1.

Examples 2 to 7, Comparative Examples 1, 2

A drawn yarn was prepared in the same manner as in Example 1 except that the melt viscosity ratio ($\eta_B/\eta_A$) of the melt viscosity ($\eta_A$) of the polyolefin (A) and the melt viscosity ($\eta_B$) of the polyester (B) in Example 1 was changed as shown in Table 1. Evaluation results of the fiber characteristics and the fabric characteristics of the fiber obtained are shown in Table 1.

In Comparative Example 1, since the melt viscosity of the polyester (B) with respect to the polyolefin (A) was high, the obtained fiber had a large orientation parameter of the polyester (B) in the fiber, that is, the molecular orientation of the polyester (B) was high. Therefore, the dye could not be sufficiently attached and the fiber was poor in color developability. In Comparative Example 2, since the melt viscosity of the polyester (B) with respect to the polyolefin (A) was low, the obtained fiber had a small orientation parameter of the polyester (B) in the fiber, that is, the molecular orientation of the polyester (B) was low. Therefore, although the fiber is excellent in color developability, loss of dye due to reduction cleaning after dyeing and loss of dye due to rubbing or washing were remarkable, and the fiber was poor in color fastness and level dyeability.

Examples 8 to 10, Comparative Example 3

A drawn yarn was prepared in the same manner as in Example 4 except that the copolymerization ratio of isophthalic acid in the polyester (B) in Example 4 was changed as shown in Table 2. Evaluation results of the fiber characteristics and the fabric characteristics of the fiber obtained are shown in Table 2.

In Comparative Example 3, since the copolymerization ratio of isophthalic acid in the polyester (B) was low and the polyester (B) as the island component was easily molecularly oriented during melt spinning, the obtained fiber had a large orientation parameter of the polyester (B) in the fiber, that is, the molecular orientation of the polyester (B) was high. Therefore, the dye could not be sufficiently attached and the fiber was poor in color developability.

Examples 11 to 13, Comparative Example 4

A drawn yarn was prepared in the same manner as in Example 4 except that the composite ratio of the polyolefin (A) and the polyester (B) in Example 4 was changed as shown in Table 2. Evaluation results of the fiber characteristics and the fabric characteristics of the fiber obtained are shown in Table 2.

In Comparative Example 4, since the composite ratio of the polyester (B) was low and the spinning stress applied to the polyester (B) as the island component during melt spinning was high, the obtained fiber had a large orientation parameter of the polyester (B) in the fiber, that is, the molecular orientation of the polyester (B) was high. Therefore, the dye could not be sufficiently attached and the fiber was poor in color developability.

Examples 14 to 19, Comparative Examples 5, 6

Drawn yarns were prepared in the same manner as in Example 4 except that the total draw ratio in Example 4 was changed to 3.7 times in Example 14, 3.5 times in Example 15, 3.4 times in Example 16, 2.6 times in Example 17, 2.5 times in Example 18, 2.4 times in Example 19, 2.0 times in Comparative Example 5, and 3.9 times in Comparative Example 6. Evaluation results of the fiber characteristics and the fabric characteristics of the fiber obtained are shown in Table 3.

In Comparative Example 5, since the total draw ratio was low, the obtained fiber had a small orientation parameter of the polyester (B) in the fiber, that is, the molecular orientation of the polyester (B) was low. Therefore, although the fiber is excellent in color developability, loss of dye due to reduction cleaning after dyeing and loss of dye due to rubbing or washing were remarkable, and the fiber was poor in color fastness and level dyeability. In Comparative Example 6, since the total draw ratio was high, the obtained fiber had a large orientation parameter of the polyester (B) in the fiber, that is, the molecular orientation of the polyester (B) was high. Therefore, the dye could not be sufficiently attached and the fiber was poor in color developability.

Examples 20, 21

Drawn yarns were prepared in the same manner as in Example 4 except that the speeds of the first godet roller, the second godet roller and the winder in Example 4 were changed to 2,000 m/min in Example 20 and 3,000 m/min in Example 21. Evaluation results of the fiber characteristics and the fabric characteristics of the fiber obtained are shown in Table 4.

Example 22

In Example 4, the spun yarn was cooled in a cooling air flow with an air temperature of 20° C. and a flow speed of 25 m/min, converged while supplying oil from an oil feeder, and taken up by a first heating roller rotating at 1,000 m/min at a temperature of 30° C., then drawn (draw ratio 3.1 times) by a second heating roller rotating at 3,100 m/min at a temperature of 130° C., and wound up by a winder rotating at 2,910 m/min via a third godet roller and fourth godet roller rotating at 2,980 m/min to obtain a drawn yarn of 84 dtex-48f. Evaluation results of the fiber characteristics and the fabric characteristics of the fiber obtained are shown in Table 4.

Examples 23 to 25

The drawn yarns obtained in Examples 4, 21, and 22 were false-twisted under the following conditions to prepare false-twisted yarns. False twisting was performed using a drawing and false twisting machine equipped with FR (feed rollers), 1DR (first draw roller), heater, cooling plate, false twister, 2DR (second draw roller), 3DR (third draw roller), entangling nozzle, 4DR (fourth draw roller), and winder, under the conditions of FR speed: 350 m/min, processing ratio between FR and 1DR: 1.05 times, hot plate type contact heater (length 110 mm): 145° C., cooling plate length: 65 mm, friction disc type friction false twister, ratio between 2DR and 3DR: 1.0 times, ratio between 3DR and 4DR: 0.98 times, entanglement provision between 3DR and 4DR with an entanglement nozzle, 4DR-winder ratio: 0.94 times, to obtain false twist textured yarns. Evaluation results of the fiber characteristics and the fabric characteristics of the fiber obtained are shown in Table 4.

Examples 26 to 28

Drawn yarns were prepared in the same manner as in Example 4 except that, in Example 4, the number of holes in the spinneret was changed to 24 in Example 26, the number of holes in the spinneret was changed to 96 in Example 27, and the discharging rate was changed to 51.1 g/min and the number of holes in the spinneret was changed to 144 in Example 28. Evaluation results of the fiber characteristics and the fabric characteristics of the fiber obtained are shown in Table 4.

Examples 29 to 34

Drawn yarns were prepared in the same manner as in Example 4 except that, in Example 4, the polyester (B) used was polyethylene terephthalate copolymerized with 30 mol % of phthalic acid as a dicarboxylic acid component in Example 29, polyethylene terephthalate copolymerized with 1.5 mol % of 5-sulfoisophthalic acid sodium (SSIA) as a dicarboxylic acid component in Example 30, polyethylene terephthalate copolymerized with 15 mol % of adipic acid as a dicarboxylic acid component in Example 31, polyethylene terephthalate copolymerized with 5% by weight of diethylene glycol (DEG) as a diol component in Example 32, polyethylene terephthalate copolymerized with 10% by weight of neopentyl glycol (NPG) as a diol component in Example 33, and polyethylene terephthalate copolymerized with 10% by weight of polyethylene glycol (PEG) (PEG1000, manufactured by Sanyo Chemical Industries Ltd., number average molecular weight 1,000 g/mol) as a diol component in Example 34. Evaluation results of the fiber characteristics and the fabric characteristics of the fiber obtained are shown in Table 5.

Examples 35, 36, Comparative Example 7

Drawn yarns were prepared in the same manner as in Example 4 except that polyethylene terephthalate (PET) was used as the polyester (B), and the melt viscosity ratio ($\eta_B/\eta_A$) of the melt viscosity ($\eta_A$) of the polyolefin (A) and the melt viscosity ($\eta_B$) of the polyester (B) in Example 4 was changed as shown in Table 6. Evaluation results of the fiber characteristics and the fabric characteristics of the fiber obtained are shown in Table 6.

In Comparative Example 7, since the copolymerization component was not copolymerized in the polyester (B), the polyester (B) as the island component was easily molecularly oriented during melt spinning and also the melt viscosity of the polyester (B) with respect to the polyolefin (A) was high so that the obtained fiber had a large orientation parameter of the polyester (B) in the fiber, that is, the molecular orientation of the polyester (B) was high. Therefore, the dye could not be sufficiently attached and the fiber was poor in color developability.

Examples 37, 38, Comparative Example 8

Drawn yarns were prepared in the same manner as in Example 4 except that polybutylene terephthalate (PBT) was used as the polyester (B), and the melt viscosity ratio ($\eta_B/\eta_A$) of the melt viscosity ($\eta_A$) of the polyolefin (A) and the melt viscosity ($\eta_B$) of the polyester (B) in Example 4 was changed as shown in Table 6. Evaluation results of the fiber characteristics and the fabric characteristics of the fiber obtained are shown in Table 6.

In Comparative Example 8, since the copolymerization component was not copolymerized in the polyester (B), the polyester (B) as the island component was easily molecularly oriented during melt spinning and also the melt viscosity of the polyester (B) with respect to the polyolefin (A) was high so that the obtained fiber had a large orientation parameter of the polyester (B) in the fiber, that is, the molecular orientation of the polyester (B) was high. Therefore, the dye could not be sufficiently attached and the fiber was poor in color developability.

Examples 39, 40, Comparative Example 9

Drawn yarns were prepared in the same manner as in Example 4 except that polylactic acid (PLA) was used as the polyester (B), and the melt viscosity ratio ($\eta_B/\eta_A$) of the melt viscosity ($\eta_A$) of the polyolefin (A) and the melt viscosity ($\eta_B$) of the polyester (B) in Example 4 was changed as shown in Table 6. Evaluation results of the fiber characteristics and the fabric characteristics of the fiber obtained are shown in Table 6.

In Comparative Example 9, since the copolymerization component was not copolymerized in the polyester (B), the polyester (B) as the island component was easily molecularly oriented during melt spinning and also the melt viscosity of the polyester (B) with respect to the polyolefin (A) was high so that the obtained fiber had a large orientation parameter of the polyester (B) in the fiber, that is, the molecular orientation of the polyester (B) was high. Therefore, the dye could not be sufficiently attached and the fiber was poor in color developability.

Examples 41 to 46

Drawn yarns were prepared in the same manner as in Example 4 except that the polyester (B) in Example 4 was changed to polypropylene terephthalate (PPT) copolymerized with 30 mol % of isophthalic acid (IPA) in Example 41, polybutylene terephthalate (PBT) copolymerized with 30 mol % of isophthalic acid (IPA) in Example 42, polyethylene naphthalate (PEN) copolymerized with 30 mol % of isophthalic acid (IPA) in Example 43, polylactic acid (PLA) copolymerized with 30 mol % of isophthalic acid (IPA) in Example 44, polyglycolic acid (PGA) copolymerized with 30 mol % of isophthalic acid (IPA) in Example 45, and polycaprolactone (PCL) copolymerized with 30 mol % of isophthalic acid (IPA) in Example 46. Evaluation results of the fiber characteristics and the fabric characteristics of the fiber obtained are shown in Table 7.

Examples 47 to 49

Drawn yarns were prepared in the same manner as in Examples 4, 30, and 31 except that the polyolefin (A) in Examples 4, 30, and 31 was changed from polypropylene to polymethylpentene (PMP) (DX820 manufactured by Mitsui Chemicals, Inc.). Evaluation results of the fiber characteristics and the fabric characteristics of the fiber obtained are shown in Table 7.

TABLE 1

| | | | Example 1 | Example 2 | Example 3 | Example 4 | Example 5 |
|---|---|---|---|---|---|---|---|
| Sea-island composite condition | Polyolefin (A) | Polymer type | PP | PP | PP | PP | PP |
| | Polyester (B) | Polymer type | Copolymer PET | Copolymer PET | Copolymer PET | Copolymer PET | Copolymer PET |
| | | Copolymerization component | IPA | IPA | IPA | IPA | IPA |
| | | Copolymerization ratio | 30 mol % | 30 mol % | 30 mol % | 30 mol % | 30 mol % |
| | Composite ratio | A/B [parts by weight] | 90/10 | 90/10 | 90/10 | 90/10 | 90/10 |
| | Melt viscosity ratio ($\eta_B/\eta_A$) | | 0.2 | 0.4 | 0.6 | 1.0 | 1.7 |
| Fiber characteristics | Fineness [dtex] | | 84 | 84 | 84 | 84 | 84 |
| | Number of filaments [filament] | | 48 | 48 | 48 | 48 | 48 |
| | Strength [cN/dtex] | | 4.4 | 4.4 | 4.4 | 4.5 | 4.6 |
| | Degree of elongation [%] | | 35 | 37 | 36 | 38 | 36 |
| | Discontinuity of island component | | A | A | A | A | A |
| | Orientation parameter | | 1.3 | 1.7 | 2.1 | 3.4 | 4.8 |
| | Crystallinity [%] | | 9 | 14 | 17 | 25 | 29 |
| Fabric characteristics | L*value (after finishing set) | Brightness | 26 | 24 | 25 | 26 | 27 |
| | ΔE | Color loss in process | 5.8 | 4.3 | 3.9 | 3.0 | 2.7 |
| | Dyeability (sensory evaluation) | Color developability | S | S | S | S | S |
| | | Level dyeability | A | A | A | S | S |
| | Rubbing fastness | Staining [grade] | 3 | 3-4 | 4 | 4-5 | 4-5 |

TABLE 1-continued

|  |  |  | | | | |
|---|---|---|---|---|---|---|
| Washing fastness | Discoloration [grade] | | 2-3 | 3 | 4 | 4-5 | 4-5 |
| | Liquid staining [grade] | | 2-3 | 3 | 3-4 | 4 | 4-5 |
| Color bleeding | Staining [grade] | | 3 | 3-4 | 4 | 4-5 | 4-5 |

| | | | Example 6 | Example 7 | Comparative Example 1 | Comparative Example 2 |
|---|---|---|---|---|---|---|
| Sea-island composite condition | Polyolefin (A) | Polymer type | PP | PP | PP | PP |
| | Polyester (B) | Polymer type | Copolymer PET | Copolymer PET | Copolymer PET | Copolymer PET |
| | | Copolymerization component | IPA | IPA | IPA | IPA |
| | | Copolymerization ratio | 30 mol % | 30 mol % | 30 mol % | 30 mol % |
| | Composite ratio | A/B [parts by weight] | 90/10 | 90/10 | 90/10 | 90/10 |
| | Melt viscosity ratio ($\eta_B/\eta_A$) | | 3.0 | 4.0 | 6.0 | 0.1 |
| Fiber characteristics | Fineness [dtex] | | 84 | 84 | 84 | 84 |
| | Number of filaments [filament] | | 48 | 48 | 48 | 48 |
| | Strength [cN/dtex] | | 4.7 | 4.9 | 5.1 | 4.4 |
| | Degree of elongation [%] | | 37 | 37 | 38 | 37 |
| | Discontinuity of island component | | A | A | A | A |
| | Orientation parameter | | 8.4 | 9.7 | 13.0 | 1.0 |
| | Crystallinity [%] | | 35 | 38 | 46 | 4 |
| Fabric characteristics | L*value (after finishing set) | Brightness | 29 | 32 | 44 | 29 |
| | ΔE | Color loss in process | 2.2 | 1.9 | 1.4 | 10.9 |
| | Dyeability (sensory evaluation) | Color developability | S | A | C | S |
| | | Level dyeability | S | S | S | C |
| | Rubbing fastness | Staining [grade] | 4-5 | 4-5 | 4-5 | 2 |
| | Washing fastness | Discoloration [grade] | 4-5 | 4-5 | 4-5 | 2 |
| | | Liquid staining [grade] | 4-5 | 4-5 | 4-5 | 1-2 |
| | Color bleeding | Staining [grade] | 4-5 | 4-5 | 4-5 | 2 |

PP: Polypropylene,
PET: Polyethylene terephthalate,
IPA: Isophthalic acid

TABLE 2

| | | | Example 8 | Example 9 | Example 10 | Comparative Example 3 |
|---|---|---|---|---|---|---|
| Sea-island composite condition | Polyolefin (A) | Polymer type | PP | PP | PP | PP |
| | Polyester (B) | Polymer type | Copolymer PET | Copolymer PET | Copolymer PET | Copolymer PET |
| | | Copolymerization component | IPA | IPA | IPA | IPA |
| | | Copolymerization ratio | 10 mol % | 50 mol % | 70 mol % | 5 mol % |
| | Composite ratio | A/B [parts by weight] | 90/10 | 90/10 | 90/10 | 90/10 |
| | Melt viscosity ratio ($\eta_B/\eta_A$) | | 1.0 | 1.0 | 1.0 | 1.0 |
| Fiber characteristics | Fineness [dtex] | | 84 | 84 | 84 | 84 |
| | Number of filaments [filament] | | 48 | 48 | 48 | 48 |
| | Strength [cN/dtex] | | 4.7 | 4.4 | 4.3 | 4.9 |
| | Degree of elongation [%] | | 37 | 36 | 37 | 38 |
| | Discontinuity of island component | | A | A | A | A |
| | Orientation parameter | | 8.2 | 1.6 | 1.2 | 12.5 |
| | Crystallinity [%] | | 34 | 14 | 8 | 43 |
| Fabric characteristics | L*value (after finishing set) | Brightness | 29 | 24 | 23 | 41 |
| | ΔE | Color loss in process | 2.2 | 4.5 | 6.2 | 1.5 |
| | Dyeability (sensory evaluation) | Color developability | S | S | S | B |
| | | Level dyeability | S | S | A | S |
| | Rubbing fastness | Staining [grade] | 4-5 | 3-4 | 3 | 4-5 |

TABLE 2-continued

|  |  |  |  |  |  |  |
|---|---|---|---|---|---|---|
|  | Washing fastness | Discoloration [grade] | 4-5 | 3 | 2-3 | 4-5 |
|  |  | Liquid staining [grade] | 4-5 | 3 | 2-3 | 4-5 |
|  | Color bleeding | Staining [grade] | 4-5 | 3-4 | 3 | 4-5 |

|  |  |  | Example 11 | Example 12 | Example 13 | Comparative Example 4 |
|---|---|---|---|---|---|---|
| Sea-island composite condition | Polyolefin (A) | Polymer type | PP | PP | PP | PP |
|  | Polyester (B) | Polymer type | Copolymer PET | Copolymer PET | Copolymer PET | Copolymer PET |
|  |  | Copolymerization component | IPA | IPA | IPA | IPA |
|  |  | Copolymerization ratio | 30 mol % | 30 mol % | 30 mol % | 30 mol % |
|  | Composite ratio | A/B [parts by weight] | 96/4 | 75/25 | 70/30 | 98/2 |
|  | Melt viscosity ratio ($\eta_B/\eta_A$) |  | 1.0 | 1.0 | 1.0 | 1.0 |
| Fiber characteristics | Fineness [dtex] |  | 84 | 84 | 84 | 84 |
|  | Number of filaments [filament] |  | 48 | 48 | 48 | 48 |
|  | Strength [cN/dtex] |  | 5.1 | 3.6 | 3.4 | 5.3 |
|  | Degree of elongation [%] |  | 37 | 38 | 38 | 39 |
|  | Discontinuity of island component |  | A | A | A | A |
|  | Orientation parameter |  | 10.0 | 1.2 | 1.1 | 12.8 |
|  | Crystallinity [%] |  | 39 | 9 | 8 | 44 |
| Fabric characteristics | L*value (after finishing set) | Brightness | 33 | 22 | 22 | 42 |
|  | ΔE | Color loss in process | 1.8 | 6.3 | 8.6 | 1.3 |
|  | Dyeability (sensory evaluation) | Color developability | A | S | S | B |
|  |  | Level dyeability | S | A | A | S |
|  | Rubbing fastness | Staining [grade] | 4-5 | 3 | 2-3 | 4-5 |
|  | Washing fastness | Discoloration [grade] | 4-5 | 2-3 | 2-3 | 4-5 |
|  |  | Liquid staining [grade] | 4-5 | 2-3 | 2-3 | 4-5 |
|  | Color bleeding | Staining [grade] | 4-5 | 3 | 2-3 | 4-5 |

PP: Polypropylene,
PET: Polyethylene terephthalate,
IPA: Isophthalic acid

TABLE 3

|  |  |  | Example 14 | Example 15 | Example 16 | Example 17 |
|---|---|---|---|---|---|---|
| Sea-island composite condition | Polyolefin (A) | Polymer type | PP | PP | PP | PP |
|  | Polyester (B) | Polymer type | Copolymer PET | Copolymer PET | Copolymer PET | Copolymer PET |
|  |  | Copolymerization component | IPA | IPA | IPA | IPA |
|  |  | Copolymerization ratio | 30 mol % | 30 mol % | 30 mol % | 30 mol % |
|  | Composite ratio | A/B [parts by weight] | 90/10 | 90/10 | 90/10 | 90/10 |
|  | Melt viscosity ratio ($\eta_B/\eta_A$) |  | 1.0 | 1.0 | 1.0 | 1.0 |
| Fiber characteristics | Fineness [dtex] |  | 84 | 84 | 84 | 84 |
|  | Number of filaments [filament] |  | 48 | 48 | 48 | 48 |
|  | Strength [cN/dtex] |  | 5.9 | 5.6 | 5.3 | 3.3 |
|  | Degree of elongation [%] |  | 11 | 18 | 22 | 62 |
|  | Discontinuity of island component |  | A | A | A | A |
|  | Orientation parameter |  | 9.9 | 9.6 | 8.6 | 2.4 |
|  | Crystallinity [%] |  | 40 | 37 | 35 | 20 |
| Fabric characteristics | L*value (after finishing set) | Brightness | 33 | 32 | 30 | 25 |
|  | ΔE | Color loss in process | 1.8 | 1.9 | 2.1 | 3.6 |
|  | Dyeability (sensory evaluation) | Color developability | A | A | A | S |
|  |  | Level dyeability | S | S | S | S |

TABLE 3-continued

|  |  |  |  |  |  |  |
|---|---|---|---|---|---|---|
|  | Rubbing fastness | Staining [grade] | 4-5 | 4-5 | 4-5 | 4 |
|  | Washing fastness | Discoloration [grade] | 4-5 | 4-5 | 4-5 | 4 |
|  |  | Liquid staining [grade] | 4-5 | 4-5 | 4-5 | 4 |
|  | Color bleeding | Staining [grade] | 4-5 | 4-5 | 4-5 | 4 |

|  |  |  | Example 18 | Example 19 | Comparative Example 5 | Comparative Example 6 |
|---|---|---|---|---|---|---|
| Sea-island composite condition | Polyolefin (A) | Polymer type | PP | PP | PP | PP |
|  | Polyester (B) | Polymer type | Copolymer PET | Copolymer PET | Copolymer PET | Copolymer PET |
|  |  | Copolymerization component | IPA | IPA | IPA | IPA |
|  |  | Copolymerization ratio | 30 mol % | 30 mol % | 30 mol % | 30 mol % |
|  | Composite ratio | A/B [parts by weight] | 90/10 | 90/10 | 90/10 | 90/10 |
|  | Melt viscosity ratio ($\eta_B/\eta_A$) |  | 1.0 | 1.0 | 1.0 | 1.0 |
| Fiber characteristics | Fineness [dtex] |  | 84 | 84 | 84 | 84 |
|  | Number of filaments [filament] |  | 48 | 48 | 48 | 48 |
|  | Strength [cN/dtex] |  | 3.3 | 3.2 | 2.7 | 6.1 |
|  | Degree of elongation [%] |  | 69 | 77 | 104 | 7 |
|  | Discontinuity of island component |  | A | A | A | A |
|  | Orientation parameter |  | 1.7 | 1.2 | 1.0 | 12.9 |
|  | Crystallinity [%] |  | 13 | 7 | 4 | 45 |
| Fabric characteristics | L*value (after finishing set) | Brightness | 26 | 27 | 30 | 43 |
|  | ΔE | Color loss in process | 4.4 | 6.4 | 11.1 | 1.4 |
|  | Dyeability (sensory evaluation) | Color developability | S | S | A | B |
|  |  | Level dyeability | A | A | C | S |
|  | Rubbing fastness | Staining [grade] | 3-4 | 3 | 2 | 4-5 |
|  | Washing fastness | Discoloration [grade] | 3 | 2-3 | 2 | 4-5 |
|  |  | Liquid staining [grade] | 3 | 2-3 | 1-2 | 4-5 |
|  | Color bleeding | Staining [grade] | 3-4 | 3 | 2 | 4-5 |

PP: Polypropylene,
PET: Polyethylene terephthalate,
IPA: Isophthalic acid

TABLE 4

|  |  |  | Example 20 | Example 21 | Example 22 | Example 23 | Example 24 |
|---|---|---|---|---|---|---|---|
| Sea-island composite condition | Polyolefin (A) | Polymer type | PP | PP | PP | PP | PP |
|  | Polyester (B) | Polymer type | Copolymer PET | Copolymer PET | Copolymer PET | Copolymer PET | Copolymer PET |
|  |  | Copolymerization component | IPA | IPA | IPA | IPA | IPA |
|  |  | Copolymerization ratio | 30 mol % | 30 mol % | 30 mol % | 30 mol % | 30 mol % |
|  | Composite ratio | A/B [parts by weight] | 90/10 | 90/10 | 90/10 | 90/10 | 90/10 |
|  | Melt viscosity ratio ($\eta_B/\eta_A$) |  | 1.0 | 1.0 | 1.0 | 1.0 | 1.0 |
| Fiber characteristics | Fineness [dtex] |  | 84 | 84 | 84 | 84 | 84 |
|  | Number of filaments [filament] |  | 48 | 48 | 48 | 48 | 48 |
|  | Strength [cN/dtex] |  | 4.4 | 4.3 | 4.6 | 4.6 | 4.4 |
|  | Degree of elongation [%] |  | 37 | 36 | 39 | 31 | 30 |
|  | Discontinuity of island component |  | A | A | A | A | A |
|  | Orientation parameter |  | 3.2 | 2.9 | 3.5 | 6.0 | 5.7 |
|  | Crystallinity [%] |  | 24 | 23 | 26 | 32 | 31 |

TABLE 4-continued

| Fabric characteristics | L*value (after finishing set) | Brightness | 26 | 25 | 26 | 29 | 28 |
|---|---|---|---|---|---|---|---|
| | ΔE | Color loss in process | 3.1 | 3.5 | 3.0 | 2.5 | 2.6 |
| | Dyeability (sensory evaluation) | Color developability | S | S | S | S | S |
| | | Level dyeability | S | S | S | S | S |
| | Rubbing fastness | Staining [grade] | 4-5 | 4-5 | 4-5 | 4-5 | 4-5 |
| | Washing fastness | Discoloration [grade] | 4-5 | 4 | 4-5 | 4-5 | 4-5 |
| | | Liquid staining [grade] | 4 | 4 | 4 | 4-5 | 4-5 |
| | Color bleeding | Staining [grade] | 4-5 | 4-5 | 4-5 | 4-5 | 4-5 |

| | | | Example 25 | Example 26 | Example 27 | Example 28 |
|---|---|---|---|---|---|---|
| Sea-island composite condition | Polyolefin (A) | Polymer type | PP | PP | PP | PP |
| | Polyester (B) | Polymer type | Copolymer PET | Copolymer PET | Copolymer PET | Copolymer PET |
| | | Copolymerization component | IPA | IPA | IPA | IPA |
| | | Copolymerization ratio | 30 mol % | 30 mol % | 30 mol % | 30 mol % |
| | Composite ratio | A/B [parts by weight] | 90/10 | 90/10 | 90/10 | 90/10 |
| | Melt viscosity ratio ($\eta_B/\eta_A$) | | 1.0 | 1.0 | 1.0 | 1.0 |
| Fiber characteristics | Fineness [dtex] | | 84 | 84 | 84 | 132 |
| | Number of filaments [filament] | | 48 | 24 | 96 | 144 |
| | Strength [cN/dtex] | | 4.7 | 4.8 | 4.2 | 4.1 |
| | Degree of elongation [%] | | 31 | 39 | 35 | 36 |
| | Discontinuity of island component | | A | A | A | A |
| | Orientation parameter | | 6.2 | 2.6 | 6.8 | 9.4 |
| | Crystallinity [%] | | 32 | 22 | 30 | 36 |
| Fabric characteristics | L*value (after finishing set) | Brightness | 29 | 24 | 28 | 32 |
| | ΔE | Color loss in process | 2.4 | 3.3 | 2.5 | 2.0 |
| | Dyeability (sensory evaluation) | Color developability | S | S | S | A |
| | | Level dyeability | S | S | S | S |
| | Rubbing fastness | Staining [grade] | 4-5 | 4-5 | 4-5 | 4-5 |
| | Washing fastness | Discoloration [grade] | 4-5 | 4-5 | 4-5 | 4-5 |
| | | Liquid staining [grade] | 4-5 | 4 | 4-5 | 4-5 |
| | Color bleeding | Staining [grade] | 4-5 | 4-5 | 4-5 | 4-5 |

PP: Polypropylene,
PET: Polyethylene terephthalate,
IPA: Isophthalic acid

TABLE 5

| | | | Example 29 | Example 30 | Example 31 | Example 32 |
|---|---|---|---|---|---|---|
| Sea-island composite condition | Polyolefin (A) | Polymer type | PP | PP | PP | PP |
| | Polyester (B) | Polymer type | Copolymer PET | Copolymer PET | Copolymer PET | Copolymer PET |
| | | Copolymerization component | Phthalic acid | SSIA | Adipic acid | DEG |
| | | Copolymerization ratio | 30 mol % | 1.5 mol % | 15 mol % | 5 wt % |
| | Composite ratio | A/B [parts by weight] | 90/10 | 90/10 | 90/10 | 90/10 |
| | Melt viscosity ratio ($\eta_B/\eta_A$) | | 1.0 | 1.0 | 1.0 | 1.0 |
| Fiber characteristics | Fineness [dtex] | | 84 | 84 | 84 | 84 |
| | Number of filaments [filament] | | 48 | 48 | 48 | 48 |
| | Strength [cN/dtex] | | 4.3 | 4.2 | 4.4 | 3.8 |
| | Degree of elongation [%] | | 37 | 39 | 38 | 37 |
| | Discontinuity of island component | | A | A | A | A |
| | Orientation parameter | | 3.2 | 6.7 | 3.0 | 1.9 |
| | Crystallinity [%] | | 24 | 31 | 23 | 14 |

TABLE 5-continued

| Fabric characteristics | L*value (after finishing set) | Brightness | 25 | 25 | 24 | 27 |
|---|---|---|---|---|---|---|
| | ΔE | Color loss in process | 3.1 | 1.9 | 3.3 | 4.1 |
| | Dyeability (sensory evaluation) | Color developability | S | S | S | S |
| | | Level dyeability | S | S | S | A |
| | Rubbing fastness | Staining [grade] | 4-5 | 4-5 | 4-5 | 3-4 |
| | Washing fastness | Discoloration [grade] | 4-5 | 4-5 | 4-5 | 3-4 |
| | | Liquid staining [grade] | 4-5 | 4-5 | 4-5 | 3 |
| | Color bleeding | Staining [grade] | 4-5 | 4-5 | 4-5 | 3-4 |

| | | | | Example 33 | Example 34 |
|---|---|---|---|---|---|
| Sea-island composite condition | Polyolefin (A) | Polymer type | | PP | PP |
| | Polyester (B) | Polymer type | | Copolymer PET | Copolymer PET |
| | | Copolymerization component | | NPG | PEG |
| | | Copolymerization ratio | | 10 wt % | 10 wt % |
| | Composite ratio | A/B [parts by weight] | | 90/10 | 90/10 |
| | Melt viscosity ratio ($\eta_B/\eta_A$) | | | 1.0 | 1.0 |
| Fiber characteristics | Fineness [dtex] | | | 84 | 84 |
| | Number of filaments [filament] | | | 48 | 48 |
| | Strength [cN/dtex] | | | 4.3 | 4.5 |
| | Degree of elongation [%] | | | 37 | 38 |
| | Discontinuity of island component | | | A | A |
| | Orientation parameter | | | 6.2 | 9.4 |
| | Crystallinity [%] | | | 31 | 37 |
| Fabric characteristics | L*value (after finishing set) | Brightness | | 29 | 32 |
| | ΔE | Color loss in process | | 2.5 | 1.9 |
| | Dyeability (sensory evaluation) | Color developability | | S | A |
| | | Level dyeability | | S | S |
| | Rubbing fastness | Staining [grade] | | 4-5 | 4-5 |
| | Washing fastness | Discoloration [grade] | | 4-5 | 4-5 |
| | | Liquid staining [grade] | | 4-5 | 4-5 |
| | Color bleeding | Staining [grade] | | 4-5 | 4-5 |

PP: Polypropylene,
PET: Polyethylene terephthalate,
SSIA: 5-Sodium sulfoisophthalic acid,
DEG: Diethylene glycol,
NPG: Neopentyl glycol,
PEG: Polyethylene glycol

TABLE 6

| | | | Example 35 | Example 36 | Comparative Example 7 | Example 37 | Example 38 |
|---|---|---|---|---|---|---|---|
| Sea-island composite condition | Polyolefin (A) | Polymer type | PP | PP | PP | PP | PP |
| | Polyester (B) | Polymer type | PET | PET | PET | PBT | PBT |
| | | Copolymerization component | — | — | — | — | — |
| | | Copolymerization ratio | — | — | — | — | — |
| | Composite ratio | A/B [parts by weight] | 90/10 | 90/10 | 90/10 | 90/10 | 90/10 |
| | Melt viscosity ratio ($\eta_B/\eta_A$) | | 0.4 | 0.6 | 1.0 | 0.4 | 0.6 |

TABLE 6-continued

| | | | | | | | |
|---|---|---|---|---|---|---|---|
| Fiber characteristics | Fineness [dtex] | | 84 | 84 | 84 | 84 | 84 |
| | Number of filaments [filament] | | 48 | 48 | 48 | 48 | 48 |
| | Strength [cN/dtex] | | 5.0 | 5.1 | 5.2 | 4.9 | 5.0 |
| | Degree of elongation [%] | | 39 | 37 | 38 | 38 | 37 |
| | Discontinuity of island component | | A | A | A | A | A |
| | Orientation parameter | | 7.6 | 9.6 | 18.5 | 7.9 | 9.8 |
| | Crystallinity [%] | | 32 | 38 | 49 | 33 | 39 |
| Fabric characteristics | L*value (after finishing set) | Brightness | 30 | 31 | 44 | 31 | 32 |
| | ΔE | Color loss in process | 2.1 | 1.7 | 1.2 | 2.0 | 1.6 |
| | Dyeability (sensory evaluation) | Color developability | A | A | C | A | A |
| | | Level dyeability | S | S | S | S | S |
| | Rubbing fastness | Staining [grade] | 4-5 | 4-5 | 4-5 | 4-5 | 4-5 |
| | Washing fastness | Discoloration [grade] | 4-5 | 4-5 | 4-5 | 4-5 | 4-5 |
| | | Liquid staining [grade] | 4-5 | 4-5 | 4-5 | 4-5 | 4-5 |
| | Color bleeding | Staining [grade] | 4-5 | 4-5 | 4-5 | 4-5 | 4-5 |

| | | | Comparative Example 8 | Example 39 | Example 40 | Comparative Example 9 |
|---|---|---|---|---|---|---|
| Sea-island composite condition | Polyolefin (A) | Polymer type | PP | PP | PP | PP |
| | Polyester (B) | Polymer type | PBT | PLA | PLA | PLA |
| | | Copolymerization component | — | — | — | — |
| | | Copolymerization ratio | — | — | — | — |
| | Composite ratio | A/B [parts by weight] | 90/10 | 90/10 | 90/10 | 90/10 |
| | Melt viscosity ratio ($\eta_B/\eta_A$) | | 1.0 | 0.4 | 0.6 | 1.0 |
| Fiber characteristics | Fineness [dtex] | | 84 | 84 | 84 | 84 |
| | Number of filaments [filament] | | 48 | 48 | 48 | 48 |
| | Strength [cN/dtex] | | 5.1 | 3.6 | 3.8 | 3.9 |
| | Degree of elongation [%] | | 36 | 37 | 36 | 38 |
| | Discontinuity of island component | | A | A | A | A |
| | Orientation parameter | | 19.7 | 8.1 | 10.0 | 20.2 |
| | Crystallinity [%] | | 50 | 34 | 39 | 51 |
| Fabric characteristics | L*value (after finishing set) | Brightness | 46 | 32 | 33 | 47 |
| | ΔE | Color loss in process | 1.1 | 1.9 | 1.5 | 1.0 |
| | Dyeability (sensory evaluation) | Color developability | C | A | A | C |
| | | Level dyeability | S | S | S | S |
| | Rubbing fastness | Staining [grade] | 4-5 | 4-5 | 4-5 | 4-5 |
| | Washing fastness | Discoloration [grade] | 4-5 | 4-5 | 4-5 | 4-5 |
| | | Liquid staining [grade] | 4-5 | 4-5 | 4-5 | 4-5 |
| | Color bleeding | Staining [grade] | 4-5 | 4-5 | 4-5 | 4-5 |

PP: Polypropylene,
PET: Polyethylene terephthalate,
PBT: Polybutylene terephthalate,
PLA: Polylactic acid

TABLE 7

| | | | Example 41 | Example 42 | Example 43 | Example 44 | Example 45 |
|---|---|---|---|---|---|---|---|
| Sea-island composite condition | Polyolefin (A) | Polymer type | PP | PP | PP | PP | PP |
| | Polyester (B) | Polymer type | Copolymer PPT | Copolymer PBT | Copolymer PEN | Copolymer PLA | Copolymer PGA |
| | | Copolymerization component | IPA | IPA | IPA | IPA | IPA |
| | | Copolymerization ratio | 30 mol % | 30 mol % | 30 mol % | 30 mol % | 30 mol % |

TABLE 7-continued

|  |  |  | | | | | |
|---|---|---|---|---|---|---|---|
| | Composite ratio | A/B [parts by weight] | 90/10 | 90/10 | 90/10 | 90/10 | 90/10 |
| | Melt viscosity ratio ($\eta_B/\eta_A$) | | 1.0 | 1.0 | 1.0 | 1.0 | 1.0 |
| Fiber characteristics | Fineness [dtex] | | 84 | 84 | 84 | 84 | 84 |
| | Number of filaments [filament] | | 48 | 48 | 48 | 48 | 48 |
| | Strength [cN/dtex] | | 4.3 | 4.4 | 4.2 | 3.2 | 3.4 |
| | Degree of elongation [%] | | 37 | 38 | 38 | 39 | 39 |
| | Discontinuity of island component | | A | A | A | A | A |
| | Orientation parameter | | 2.8 | 5.9 | 9.6 | 8.8 | 2.1 |
| | Crystallinity [%] | | 23 | 30 | 39 | 35 | 17 |
| Fabric characteristics | L*value (after finishing set) | Brightness | 24 | 29 | 34 | 32 | 21 |
| | ΔE | Color loss in process | 3.3 | 2.5 | 1.8 | 2.0 | 3.8 |
| | Dyeability (sensory evaluation) | Color developability | S | S | A | A | S |
| | | Level dyeability | S | S | S | S | A |
| | Rubbing fastness | Staining [grade] | 4-5 | 4-5 | 4-5 | 4-5 | 4 |
| | Washing fastness | Discoloration [grade] | 4-5 | 4-5 | 4-5 | 4-5 | 4 |
| | | Liquid staining [grade] | 4 | 4-5 | 4-5 | 4-5 | 3-4 |
| | Color bleeding | Staining [grade] | 4-5 | 4-5 | 4-5 | 4-5 | 4 |

|  |  |  | Example 46 | Example 47 | Example 48 | Example 49 |
|---|---|---|---|---|---|---|
| Sea-island composite condition | Polyolefin (A) | Polymer type | PP | PMP | PMP | PMP |
| | Polyester (B) | Polymer type | Copolymer PCL | Copolymer PET | Copolymer PET | Copolymer PET |
| | | Copolymerization component | IPA | IPA | SSIA | Adipic acid |
| | | Copolymerization ratio | 30 mol % | 30 mol % | 1.5 mol % | 15 mol % |
| | Composite ratio | A/B [parts by weight] | 90/10 | 90/10 | 90/10 | 90/10 |
| | Melt viscosity ratio ($\eta_B/\eta_A$) | | 1.0 | 1.0 | 1.0 | 1.0 |
| Fiber characteristics | Fineness [dtex] | | 84 | 84 | 84 | 84 |
| | Number of filaments [filament] | | 48 | 48 | 48 | 48 |
| | Strength [cN/dtex] | | 3.7 | 2.4 | 2.2 | 2.3 |
| | Degree of elongation [%] | | 38 | 37 | 36 | 37 |
| | Discontinuity of island component | | A | A | A | A |
| | Orientation parameter | | 1.9 | 3.3 | 6.7 | 3.1 |
| | Crystallinity [%] | | 15 | 24 | 32 | 23 |
| Fabric characteristics | L*value (after finishing set) | Brightness | 21 | 24 | 23 | 23 |
| | ΔE | Color loss in process | 4.0 | 3.3 | 2.1 | 3.2 |
| | Dyeability (sensory evaluation) | Color developability | S | S | S | S |
| | | Level dyeability | A | S | S | S |
| | Rubbing fastness | Staining [grade] | 3-4 | 4-5 | 4-5 | 4-5 |
| | Washing fastness | Discoloration [grade] | 3-4 | 4 | 4 | 4 |
| | | Liquid staining [grade] | 3 | 4 | 4 | 3-4 |
| | Color bleeding | Staining [grade] | 3-4 | 4 | 4 | 4 |

PP: Polypropylene,
PMP: Polymethylpentene,
PPT: Polypropylene terephthalate,
PBT: Polybutylene terephthalate,
PEN: Polyethylene naphthalate,
PLA: Polylactic acid,
PGA: Polyglycolic acid,
PCL: Polycaprolactone,
PET: Polyethylene terephthalate,
IPA: Isophthalic acid,
SSIA: 5-Sodium sulfoisophthalic acid

INDUSTRIAL APPLICABILITY

The dyeable polyolefin fiber is imparted with bright and deep color developability to the lightweight polyolefin fiber, that is also excellent in terms of color fastness and level dyeability and can be suitably adopted as a fibrous structure.

The invention claimed is:

1. A dyeable polyolefin fiber comprising a polymer alloy fiber having a sea-island structure comprising a polyolefin (A) as a sea component and a polyester (B) as an island component and having a degree of elongation of 10 to 80%, wherein the polyester (B) in the dyeable polyolefin fiber has an orientation parameter, as determined by Raman spectroscopy, of 1.1 to 10.0, and a melt viscosity ratio ($\eta_B/\eta_A$) of a melt viscosity ($\eta_A$ (Pa·s)) of the polyolefin (A) as the sea component and a melt viscosity ($\eta_B$ (Pa·s)) of the polyester (B) as the island component is 1.0 to 5.0, and the polyester (B) is a copolyester.

2. The dyeable polyolefin fiber according to claim 1, wherein the polyester (B) in the dyeable polyolefin fiber has a crystallinity, as determined by Raman spectroscopy, of 1 to 40%.

3. The dyeable polyolefin fiber according to claim 1, wherein a main constituent component of the polyester (B) is a dicarboxylic acid component (B1) and a diol component (B2), the dicarboxylic acid component (B1) is at least one dicarboxylic acid component (B1) selected from an aliphatic dicarboxylic acid (B1-1), an alicyclic dicarboxylic acid (B1-2) and an aromatic dicarboxylic acid (B1-3).

4. The dyeable polyolefin fiber according to claim 3, wherein the diol component (B2) is at least one diol component (B2) selected from an aliphatic diol (B2-1), an alicyclic diol (B2-2) and an aromatic diol (B2-3).

5. The dyeable polyolefin fiber according to claim 1, wherein a main constituent component of the polyester (B) is at least one selected from the group consisting of an aliphatic oxycarboxylic acid, an alicyclic oxycarboxylic acid, and an aromatic oxycarboxylic acid.

6. A fibrous structure at least partly comprising the dyeable polyolefin fiber according to claim 1.

* * * * *